May 24, 1966 R. L. LITTLER 3,253,219
METHOD USING CHANGE OF PIEZOELECTRIC CRYSTAL FREQUENCY TO
DETERMINE CORROSION RATE AND APPARATUS THEREFOR
Filed June 1, 1961
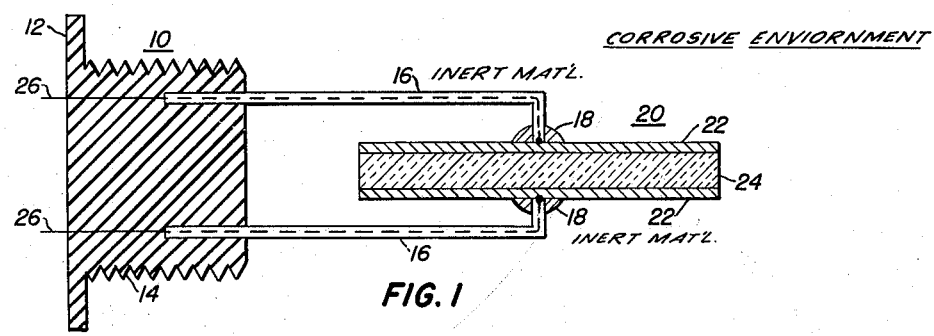
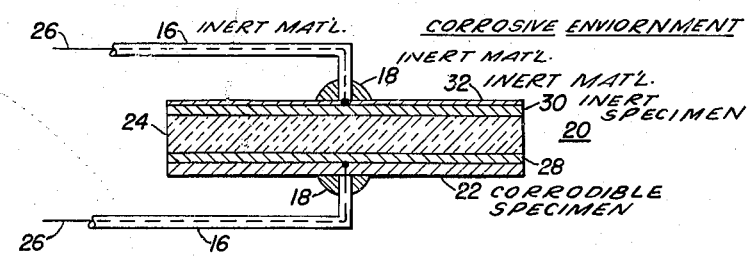
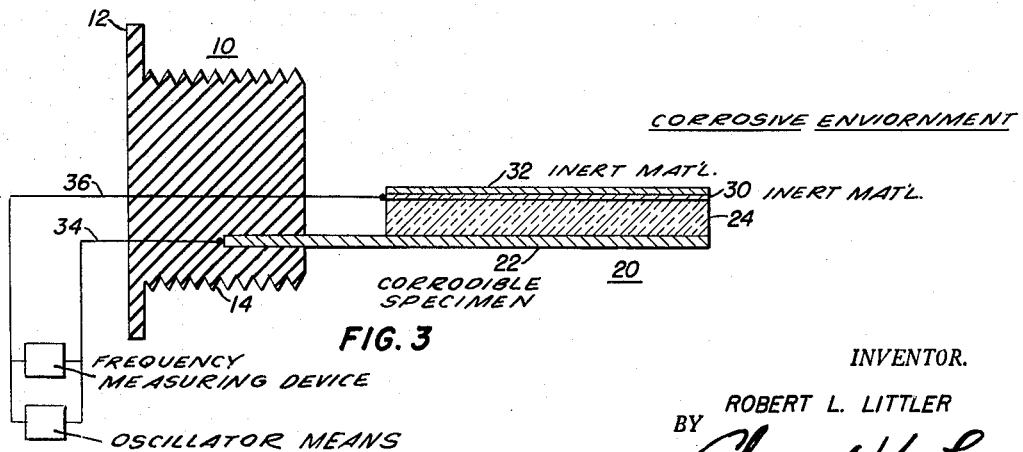
INVENTOR.
ROBERT L. LITTLER
BY
*Edward W. Long*
ATTORNEY 3,253,219
METHOD USING CHANGE OF PIEZOELECTRIC CRYSTAL FREQUENCY TO DETERMINE CORROSION RATE AND APPARATUS THEREFOR
Robert L. Littler, Crystal Lake, Ill., assignor, by mesne assignments, to Union Oil Company of California, Los Angeles, Calif., a corporation of California
Filed June 1, 1961, Ser. No. 114,172
9 Claims. (Cl. 324—71)

This invention relates to a device and method for determining the rate of corrosion of a corrodible specimen exposed to a corrosive environment and, more particularly, to an apparatus which consists of a piezoelectric element, to which is affixed one or more corrodible specimens, in combination with means for exciting the piezoelectric element and means for measuring its oscillation frequency.

The corrosion-test probe of this invention is based on the principle of piezoelectricity. A piezoelectric crystal is one which is capable of being excited to resonance vibration by an alternating electric field of the proper frequency. It is known that the resonance frequency of a piezoelectric crystal can be modified by affixing a mass of material to one or both sides of the crystal, the oscillation frequency decreases as more mass is attached to the element. Activity or response should also decrease. The test probe of this invention is based upon this principle. Instead of controlling the thickness of the material to achieve a certain frequency of vibration, the thickness of the material is permitted to decrease as a result of being exposed to a corrosive environment and the resulting frequency change is noted.

Accordingly, it is an object of this invention to provide a method and apparatus for determining the corrosiveness of a corrosive environment.

Another object of this invention is to provide an apparatus for determining the rate of corrosion of a corrodible specimen which is exposed to a corrosive environment.

Another object of this invention is to provide a corrosion-test probe comprising a piezoelectric crystal to which is affixed a corrodible test specimen with means for exciting the crystal and measuring its oscillation frequency.

Another object of this invention is to provide a corrosion-test probe adapted to be inserted in a corrosive environment comprising a corrodible test specimen affixed to a piezoelectrical crystal, with electrical means connected to the crystal to cause it to vibrate, and means to measure the vibrational frequency and/or the crystal activity or response.

These and further objects of the invention will become apparent or be described as the description proceeds.

In accordance with this invention, a test probe which consists of a piezoelectric crystal assemblage is inserted within the corrosive environment under study. Affixed to at least one side of a piezoelectric crystal is a corrodible test specimen of which the rate of corrosion is to be determined. As the thickness of the test specimen decreases due to the corrosive environment, the frequency of vibration and the activity of the crystal increases. The rate of corrosion of the test specimen over a period of time is then determined by the change of resonance frequency of the crystal over that interval of time.

The invention is best understood in relation to the drawings wherein,

FIGURE 1 is a cross-sectional view of one form of the corrosion-test probe.

FIGURE 2 is a cross-sectional view of another form of the crystal assemblage.

FIGURE 3 is a cross-sectional view of another form of the corrosion-test probe.

Referring to the drawings, wherein corresponding parts bear the same numeral and the specific embodiments shown are merely illustrative, in FIGURE 1, base member 10 is provided with flange 12 and threaded portion 14. Threaded portion 14 is adapted to engage a threaded aperture through the wall of the vessel confining the corrosive environment which is under study. The base member 10 is preferably constructed of a material which is inert to the corrosive environment and non-conductive to an electric current. Extending from base member 10 are two spaced, hollow, rodlike supports 16 which are bent at right angles toward one another near their extremities, away from base member 10. Supports 16 are also preferably of a material which will withstand the action of the corrosive environment and is non-conductive to an electric current. Small hemispheres 18, of the same material as supports 16, and having openings normal to the truncated surfaces, are secured to the ends of supports 16 with the truncated surfaces pressed against crystal assemblage 20 to hold it in place. Crystal assemblage 20 consists of the test specimens 22 which are metal films cemented, or affixed by vacuum deposition, to both sides of quartz crystal 24. As shown in this embodiment, the test specimens also serve as the electrodes of quartz crystal 24 since they are metal films. Lead wires 26 extend through base member 10 and supports 16, and are attached to test specimens 22. Lead wires 26 are thus protected from the corrosive environment. Hemispheres 18 are preferably sealed around the peripheries by a material such as an expoxy resin to prevent leakage of the corrosive environment between hemispheres 18 and test specimens 22, and exposure of lead wires 26 to same. Lead wires 26 serve to connect the crystal assemblage to a circuit for exciting it and for measuring the resonance frequency. Since the various circuits for exciting the crystal and for measuring the vibrational response are known in the art, and no invention is being alleged as to this portion of the apparatus, the description thereof is omitted from the description of this invention.

In FIGURE 2, another form of the crystal assemblage is shown wherein the corrodible test specimen would not serve as a satisfactory electrode. For example, if a study is being made of the resistance of a plastic, such as a vinyl acetate resin, to a strong acidic environment, electrodes would have to be provided. In this embodiment, lead wires 26 are connected to electrodes 28 and 30 plated on both sides of the quartz crystal 24. On one side of the crystal 24, test specimen 22 is cemented to electrode 28. If necessary, electrode 30 may be coated with a thin layer of material 32 which is inert to the corrosive fluid to prevent its deterioration.

In the embodiment shown in FIGURE 3, the length of test specimen 22 is greater than that of quartz crystal 24. The free end of test specimen 22 is inserted in base member 10, thereby serving to support crystal assemblage 20. An electrode 30 is plated on crystal 24 on the side opposite that affixed to test specimen 22. If necessary, electrode 30 may be protected with a thin layer of material 32, inert to the corrosive environment. Lead wire 34 is connected to test specimen 22 within base member 10, thus being protected from the corrosive atmosphere. Lead wire 36, connected to electrode 30, is preferably coated with a material inert to the corrosive environment in the portion in which it is exposed thereby.

To illustrate the use of the device of this invention, a test probe having a corrodible test specimen affixed to only one side of the crystal is installed on the wall of the vessel in the corrosive environment under study. Then a circuit which includes an oscillator for exciting the crystal and means for measuring the frequency is connected between the lead wires. The crystal assemblage is excited by the oscillator and the frequency is measured.

Accurate measurements can be made by measuring frequencies against an accurate frequency standard. The test probe is kept within the corrosive environment and the thickness of the test specimen affixed to the crystal is decreased by the action of the environment. After a period of time, the crystal is again excited and the vibrational frequency noted. Since the oscillation frequency of the crystal is a decreasing function of the thickness of the test specimen, the change in frequency is correlative to the corrosion rate. For example, there is a change in oscillation frequency of about 1 c.p.s. per angstrom thickness of the test specimen in a thickness shear mode AT-cut crystal with a 3.5 m.c. oscillating frequency.

Although the invention has been described in relation to the specific embodiments shown in the drawings, these are not to be construed as limiting the scope thereof. In general, the invention is intended to encompass a corrosion-test probe which consists of a corrodible specimen affixed to one or both sides of a piezoelectric crystal. Mechanical embodiments may be changed without departing from the invention. The base member and supports may be composed of any non-conductive material which is adapted to form a support for the crystal assemblage and expose same to the corrosive environment without being deteriorated by the corrosive environment. They may be made of material such as epoxy resin laminates, polystyrene, or polytetrafluorethane, dependent on the temperature and nature of the corrosive environment. Other suitable materials may be found in Modern Plastics, Encyclopedia Issue for 1961, volume 38, No. 1A, September 1960, pages 600–664.

In addition to quartz, other materials having piezoelectric properties are suitable for use in the corrosion-test probe of this invention. These include Rochelle salt, barium titanate, salts of tartaric acid, and ammonium dihydrogen phosphate.

The test specimens are of any material for which the rate of corrosion is desired. For example, the test specimens may be of the same material as the vessel wall which confines the corrosive environment, or they may be of any metal or metal alloy, produced by any method of fabrication. The corrodible specimens may be plated, vacuum deposited, or cemented on the piezoelectric crystals. While the use of piezoelectric crystals on which metal has been plated probably will be the easiest and least expensive, because of the availability of suitable plated crystals, the use of piezoelectric crystals capable of producing or utilizing high-wattage energy will permit greater latitude in the thickness of the metal specimen and the types of bonding which be may used. For example, test specimens having thicknesses of 1 to 10 mils may be cemented to the crystal, thereby permitting longer test periods, resulting in greater accuracy.

The test specimens may be affixed to either one or both sides of the crystal. If the composition of the corrodible test specimens is such that they may also serve as at least one of the electrodes, it will not be necessary to provide a separate metallic film electrode on the side of the crystal on which the specimen is affixed. If the specimens will not serve as suitable electrodes, it will be necessary to provide a thin film of a suitable conductive material on each side of the crystal to use as electrodes. For example, metallic deposits of aluminum, silver, or gold, about 0.0005 mm. thick would be suitable. If an electrode would otherwise be exposed to the corrosive environment, it preferably is protected with a thin coating of material, such as Teflon, epoxy resin or rubber, which is inert to the corrosive atmosphere. Any lead wire which would otherwise be exposed to the corrosive environment is similarly coated to protect it against the action of the environment under study.

The apparatus of this invention may be used to test the action of any type of vapor, liquid, or mixed-phase corrosive atmosphere. To illustrate, the corrosive atmosphere may be concentrated or dilute mixtures, or solutions, of organic and inorganic salts, acids, or bases, or of gases. The apparatus and process apply to the physical disintegration of the test specimen by erosion, as well as to chemical disintegration by corrosion. The term corrosion as used herein is thereby intended to include both the physical and chemical disintegration of a test specimen.

The embodiments of the invention in which an exclusive property or privilege is claimed are defined as follows:

1. A corrosion test probe adapted to be inserted in a corrosive environment comprising a piezoelectric crystal having electrically conductive surfaces on opposite faces thereof; a first specimen on one of said conductive surfaces adapted to be exposed to said corrosive environment and being corrodible thereby; a second specimen on the other of said conductive surfaces adapted to be exposed to said corrosive environment and being inert thereto; and electrical conductor means electrically connected to each of said electrically conductive surfaces.

2. A corrosion test probe according to claim 1 in which said first and second specimens isolate said electrically conductive surfaces from said corrosive environment.

3. A corrosion test probe adapted to be exposed to a corrosive environment comprising a piezoelectric crystal having electrically conductive surfaces on opposite faces thereof; one of said surfaces being corrodible by said corrosive environment and the other of said surfaces being inert to said corrosive environment; and electrical conductor means electrically connected to each of said electrically conductive surfaces.

4. A corrosion test probe according to claim 3 in which said inert surface is covered with a substance to isolate same from said corrosive environment.

5. A corrosion test probe according to claim 4 which includes a base member adapted to be inserted in sealed relationship through a wall of a vessel confining said corrosive environment and a pair of elongated, rod-like, hollow support members attached to and extending from said base member, said support members having the extended ends thereof bent toward one another to support said piezoelectric crystal therebetween.

6. A corrosion test probe according to claim 5 in which said electrical conductor means electrically connected to each of said electrically conductive surfaces extends through each of said supports.

7. A corrosion test probe according to claim 4 in which one of said electrically conductive surfaces is formed by an electrically conductive element which extends beyond said piezoelectric crystal and the extended portion thereof is supported by a base member adapted to be inserted in sealed relationship through a wall of a vessel confining said corrosive environment.

8. The method of measuring the rate of corrosion of a corrodible test specimen which comprises exposing to a corrosive environment said test specimen operatively connected to a piezoelectric crystal so that the oscillation frequency of said piezoelectric crystal varies as the thickness of said test specimen varies, determining the change in oscillation frequency of said piezoelectric crystal over a period of time, and determining the rate of corrosion of said test specimen as a function of the change in oscillation frequency of said piezoelectric crystal.

9. The method of measuring the rate of corrosion of a corrodible test specimen which comprises exposing to a corrosive environment said test specimen operatively connected to a first face of a piezoelectric crystal so that the oscillation frequency of said piezoelectric crystal varies as the thickness of said test specimen varies, the face of said piezoelectric crystal opposite said first face and exposed to said corrosive environment having a substance thereon being inert to said corrosive environment, determining the change in oscillation frequency of said piezoelectric crystal over a period of time, and determining the rate of corrosion of said corrodible test specimen as a function of the change in oscillation frequency of said piezoelectric crystal.

References Cited by the Examiner

UNITED STATES PATENTS

| | | | |
|---|---|---|---|
| 2,430,013 | 11/1947 | Hansell | 340—10 |
| 2,505,370 | 4/1950 | Sykes | 324—56 X |
| 2,562,917 | 8/1951 | Hoyt | 324—56 |
| 2,572,667 | 10/1951 | Ruggles | 324—56 |
| 2,733,405 | 1/1956 | Gerber | 324—56 |
| 2,814,575 | 11/1957 | Lange | 340—10 X |
| 2,850,651 | 9/1958 | Hoffman | 310—9.4 |
| 2,877,338 | 3/1959 | Berge | 324—56 X |
| 2,934,661 | 4/1960 | Chambers | 310—9.4 |
| 2,965,773 | 12/1960 | Hill | 310—9.4 |
| 2,991,439 | 7/1961 | Marsh et al. | 324—71 |
| 3,022,431 | 2/1962 | McKnight | 310—9.4 |

WALTER L. CARLSON, *Primary Examiner.*

J. P. O'BRIEN, CHARLES F. ROBERTS,
*Assistant Examiners.*